United States Patent
Skelton et al.

(10) Patent No.: US 12,461,330 B2
(45) Date of Patent: Nov. 4, 2025

(54) EYE RELIEF ADJUSTMENT MECHANISM AND HEADSET DISPLAY DEVICE INCLUDING EYE RELIEF ADJUSTMENT MECHANISM

(71) Applicant: Meta Platforms Technologies, LLC, Menlo Park, CA (US)

(72) Inventors: Robert Coleman Skelton, Woodinville, WA (US); Brett Delainey Christie, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 348 days.

(21) Appl. No.: 18/068,000

(22) Filed: Dec. 19, 2022

(65) Prior Publication Data

US 2024/0134145 A1 Apr. 25, 2024

Related U.S. Application Data

(60) Provisional application No. 63/380,588, filed on Oct. 24, 2022.

(51) Int. Cl.
*G02B 7/04* (2021.01)

(52) U.S. Cl.
CPC ...................... *G02B 7/04* (2013.01)

(58) Field of Classification Search
CPC ................. G02B 7/04; G02B 27/0179; G02B 2027/0154; G02B 2027/0181; G02B 27/0176
See application file for complete search history.

(56) References Cited

U.S. PATENT DOCUMENTS

| 2003/0063906 A1* | 4/2003 | Abe | G03B 13/00 |
| | | | 396/432 |
| 2012/0057944 A1* | 3/2012 | Nagata | B23F 5/163 |
| | | | 409/48 |

(Continued)

FOREIGN PATENT DOCUMENTS

| CN | 106444025 A | 2/2017 |
| WO | 2018090882 A1 | 5/2018 |

OTHER PUBLICATIONS

CN 104932103 B machine translation (Year: 2017).*

(Continued)

*Primary Examiner* — James A Dudek
(74) *Attorney, Agent, or Firm* — McDermott Will & Schulte LLP (57) ABSTRACT

Aspects of the present disclosure are directed to an adjustment mechanism for adjusting an eye-to-lens distance of a headset display device. The adjustment mechanism can include an adjustment wheel that is rotatable by a user, a pinion gear fixed to a screw, and a threaded member receiving the screw and mounted to a forehead pad frame supporting a forehead pad. The adjustment wheel can include an internal bevel gear ring. The pinion gear is rotated by rotation of the internal bevel gear ring, and the screw rotates with the pinion gear. The pinion gear and the screw can rotate about a second axis. The threaded member moves along the screw, as the screw rotates, to move the forehead pad to adjust the eye-to-lens distance. The internal bevel gear ring, the pinion gear, and the screw are configured to allow additional components to pass through an interior of the adjustment wheel.

19 Claims, 7 Drawing Sheets

(56) References Cited

U.S. PATENT DOCUMENTS

2015/0138645 A1      5/2015  Yoo et al.
2016/0334627 A1*    11/2016  Yang .................. G02B 27/0172
2019/0187480 A1      6/2019  Ma et al.

OTHER PUBLICATIONS

EPO—International Search Report and Written Opinion for International Application No. PCT/US2023/032016, mailed Dec. 19, 2023, 11 pages.

* cited by examiner

EYE RELIEF ADJUSTMENT MECHANISM AND HEADSET DISPLAY DEVICE INCLUDING EYE RELIEF ADJUSTMENT MECHANISM

CROSS-REFERENCE TO RELATED APPLICATIONS

This application claims priority to U.S. Provisional Patent Application No. 63/380,588, titled "Eye Relief Adjustment Mechanism and Headset Display Device Including Eye Relief Adjustment Mechanism," filed Oct. 24, 2022, which is herein incorporated by reference in its entirety.

TECHNICAL FIELD

The present disclosure is directed to an adjustment mechanism for adjusting eye relief of a headset display device, and a headset display device including the mechanism.

BACKGROUND

Virtual reality (VR) headsets have become increasingly popular due to their ability to implement applications, such as gaming applications, that deliver immersive and interactive audiovisual experiences. For example, a conventional VR headset is configured to be secured on a user's face over the user's eyes, and includes a pair of optics modules including respective lenses configured to pass stereoscopic images therethrough from a screen of the VR display device. Ensuring that the lenses are properly spaced from the user's eyes is important for quality of the user's VR experience. Thus, a VR headset can include an adjustment mechanism for adjusting eye relief—a distance between A) the user's eyes and B) the lenses.

The features and aspects introduced here may be better understood by referring to the following Detailed Description in conjunction with the accompanying drawings, in which like reference numerals indicate identical or functionally similar elements. The drawings may not be to scale, and the relative size, proportions, and depiction of elements in the drawings may be exaggerated for clarity, illustration, and convenience.

DETAILED DESCRIPTION

Aspects of the present disclosure are directed to an adjustment mechanism for adjusting an eye-to-lens distance of a headset display device. The adjustment mechanism can include an adjustment wheel that is rotatable by a user's finger(s) or thumb, a pinion gear fixed to a screw, and a threaded member receiving the screw and mounted to a forehead pad frame supporting a forehead pad. The adjustment wheel can include an internal bevel gear ring configured to rotate about a first axis. The pinion gear is configured to be rotated by rotation of the internal bevel gear ring, and the screw is configured to rotate together with the pinion gear. The screw and the pinion gear can rotate about a second axis that is inclined with respect to the first axis. The threaded member is configured to move along the screw, in response to the screw being rotated, to move the forehead pad, and thereby adjust the eye-to-lens distance. The internal bevel gear ring, the pinion gear, and the screw are configured to allow additional components of the headset display device, such as datuming components, cables, wires, a heat sink, or other electrical components, mechanical components, and structural components, to pass through an interior space of the adjustment wheel to adjacent spaces in the headset display device. Thus, the adjustment mechanism enables efficient packaging of components in the headset display device.

Other aspects of the present disclosure are directed to a headset display device including the adjustment mechanism.

According to embodiments described herein, an adjustment mechanism for adjusting an eye-to-lens distance of a headset display device can include: an adjustment wheel rotatable by user and including an internal bevel gear ring configured to rotate about a first axis; a pinion gear meshed with the internal bevel gear ring and configured to rotate about a second axis, in response to the internal bevel gear ring being rotated about the first axis; and a screw fixed to the pinion gear and configured to rotate together with the pinion gear to move a forehead pad of the headset display device.

In some embodiments, the second axis can be inclined with respect to the first axis.

In some embodiments, an angle of incline between the first axis and the second axis can be about 10 degrees.

In some embodiments, the adjustment mechanism can further include a nut fixed to a forehead pad frame supporting the forehead pad. The nut can receive the screw and can be configured to move along the screw to move the forehead pad frame, in response to the screw being rotated.

In some embodiments, the adjustment mechanism can further include a threaded member disposed in a forehead pad frame supporting the forehead pad. The threaded member can receive the screw and can be configured to move along the screw to move the forehead pad frame, in response to the screw being rotated.

In some embodiments, the adjustment mechanism can further include: a first wheel housing disposed at a first side of the adjustment wheel and can be configured to be attached to a first frame member of the headset display device; and a second wheel housing disposed at a second side of the adjustment wheel and configured to be attached to a second frame member of the headset display device. The first and second wheel housings can support an inner surface of the internal bevel ring gear such that the internal bevel gear ring is rotatable with respect to the first and second wheel housings.

In some embodiments, the first wheel housing can include a first opening and the second wheel housing can include a second opening. The first and second openings and an interior space of the adjustment wheel can be configured as a pass-through for a datuming component of a main thermal frame of the headset display device.

In some embodiments, the internal bevel gear ring and the pinion gear can have a gear ratio of about 3:1 and the screw has a pitch of about 2.7 mm.

According to embodiments disclosed herein, a headset display device can include: an outer housing; lenses disposed in the outer housing and configured to pass an image from a screen; a forehead pad attached to the outer housing and configured to engage a forehead of a user to position eyes of the user with respect to the lenses; and a forehead pad adjustment assembly. The forehead pad adjustment assembly can include: an adjustment wheel partially exposed outside the outer housing and including an internal bevel gear ring that is rotatable about a first axis by the user; a pinion gear meshed with the internal bevel gear ring and configured to rotate about a second axis, in response to the internal bevel gear ring being rotated about the first axis; and a screw fixed to the pinion gear and operatively connected to the forehead pad, the screw being configured to rotate together with the pinion gear to move the forehead pad and thereby change a distance between the lenses and the forehead pad.

In some embodiments, the second axis can be inclined with respect to the first axis.

In some embodiments, the forehead pad adjustment assembly can further include a threaded member disposed in a forehead pad frame supporting the forehead pad. The threaded member can receive the screw and can be configured to move along the screw, in response to the screw being rotated, to move the forehead pad frame and thereby change the distance between the lenses and the forehead pad.

In some embodiments, the threaded member can be a nut.

In some embodiments, the forehead pad adjustment assembly can further include: a first wheel housing disposed at a first side of the adjustment wheel and attached to a first frame member of the headset display device; and a second wheel housing disposed at a second side of the adjustment wheel and attached to a second frame member of the headset display device. The first and second wheel housings can support an inner surface of the internal bevel gear ring such that the internal bevel ring gear is rotatable with respect to the first and second wheel housings.

In some embodiments, the first wheel housing can include a first opening and the second wheel housing can include a second opening. A datuming component can pass through the first and second openings and an open interior space of the adjustment wheel.

In some embodiments, the adjustment wheel can be partially disposed adjacent to a main optical rail of the headset display device, in an interior space of the outer housing.

In some embodiments, a 360-degree rotation of the adjustment wheel can cause the forehead pad to move about 6 mm in a direction of the second axis.

In some embodiments, the adjustment wheel can include an annular grip disposed on an outer surface of the internal bevel gear ring.

According to embodiments disclosed herein, an adjustment mechanism for adjusting an eye-to-lens distance of a headset display device can include: a first gear disposed in the headset display device and rotatable about a first axis by a user; a second gear meshed with the first gear in the headset display device and configured to rotate about a second axis, in response to the first gear being rotated about the first axis; and a screw fixed to the second gear in the headset display device and configured to rotate together with the second gear to move a forehead pad of the headset display device. The second axis can be inclined with respect to the first axis.

In some embodiments, an angle of incline between the first axis and the second axis can be about 10 degrees.

In some embodiments, the first gear can have an open interior space configured to accommodate a datuming component of a main thermal frame of the headset display device.

Several embodiments are discussed below in more detail in reference to the figures.

Figure 1A:
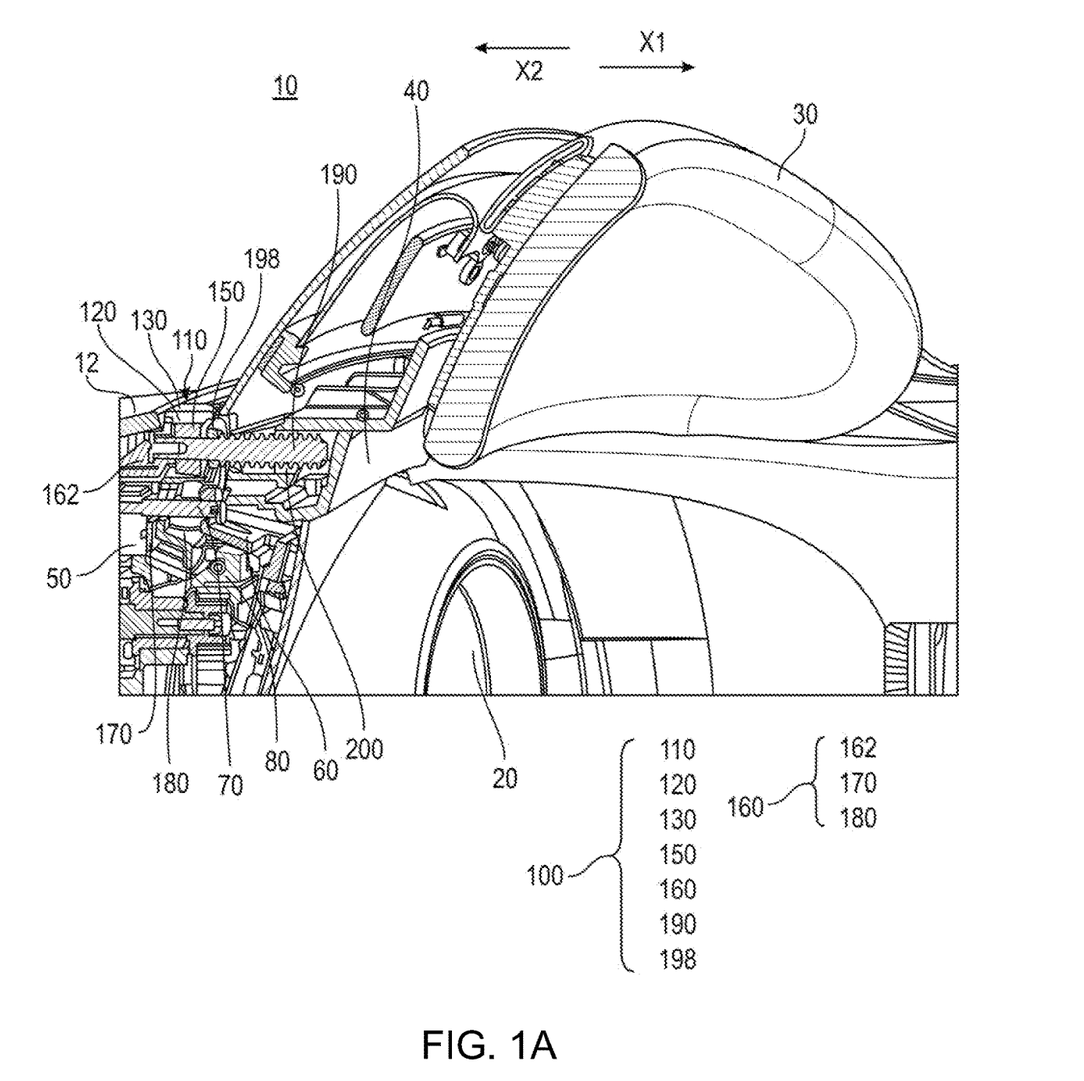
FIGS. 1A and 1B are perspective cross-sectional views showing a portion of a headset display device including an eye relief adjustment mechanism.
Figure 1B:
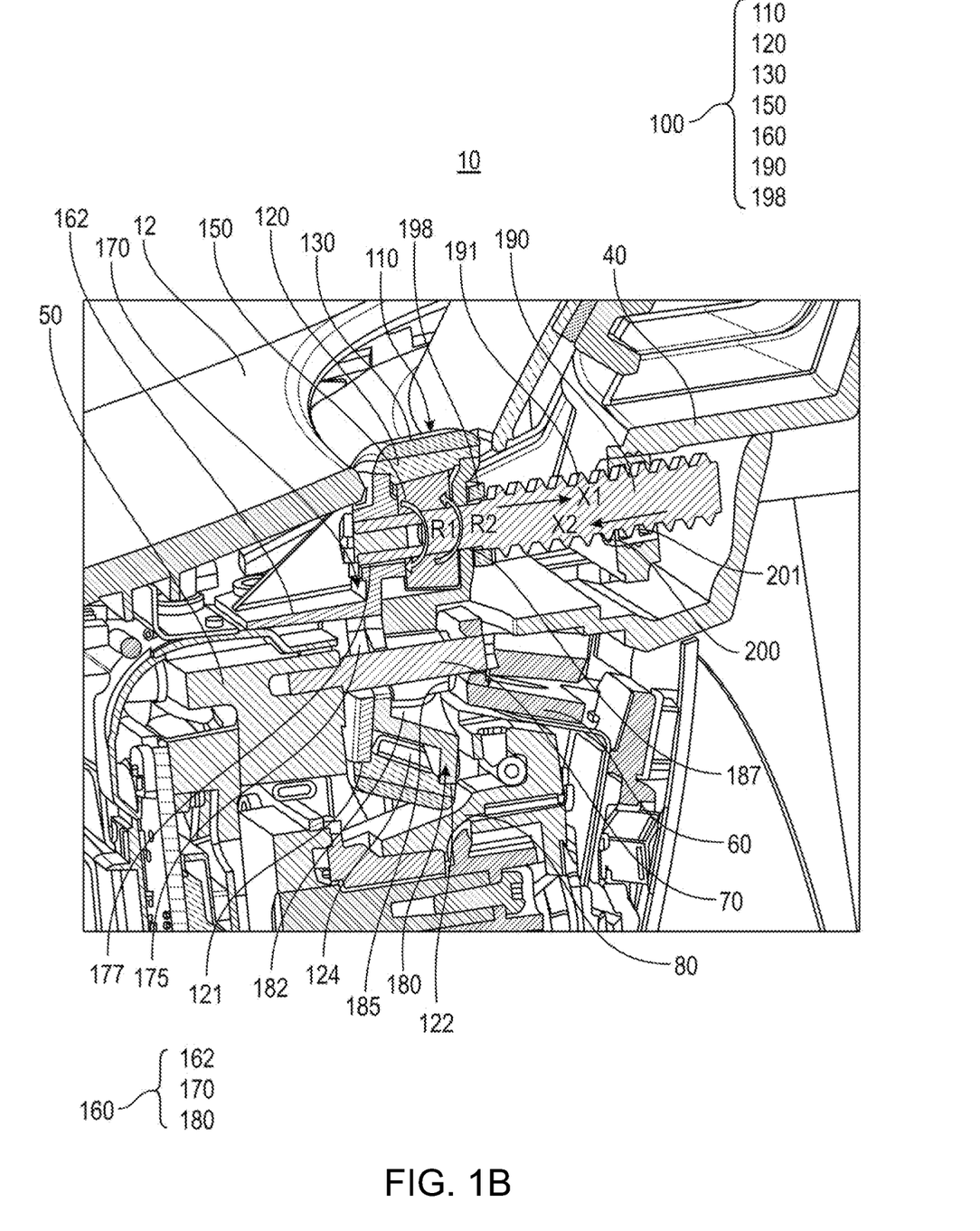

FIGS. 1A and 1B are perspective cross-sectional views showing a portion of a headset display device 10 including an eye relief adjustment mechanism 100. The headset display device 10 can be, for example, a virtual reality (VR) headset that is configured to be secured on a user's face over the user's eyes.

Referring to FIG. 1A, the headset display device 10 includes an outer housing 12 and a lens 20 disposed in the outer housing 12 and configured to pass an image therethrough from a screen of the headset display device 10. The headset display device 10 includes forehead pad 30 attached to the outer housing 12 and configured to engage a forehead of the user to maintain a desired distance between the user's eye and the lens 20. Although FIG. 1A only shows one lens 20 (e.g., a right lens), it is to be understood that the headset display device 10 includes another lens 20 (e.g., a left lens), and that the forehead pad 30 also maintains the desired distance between the user's other eye and the other lens 20.

As shown in FIGS. 1A and 1B, the headset display device 10 further includes a forehead pad frame 40 that supports the forehead pad 30 and is connected to the eye relief adjustment mechanism 100 for adjusting a position of the forehead pad 30 forward and backward in directions X1 and X2, respectively, and thereby adjusting a distance between the user's eyes and the lenses 20 (also referred to as "eye relief" or "eye-to-lens distance") as described later in more detail.

Referring to FIGS. 1A and 1B, the eye relief adjustment mechanism 100 includes an adjustment wheel 110 disposed at a top portion of the headset display device 10 and partially exposed outside of the outer housing 12, a bevel pinion gear 150 configured to be driven by the adjustment wheel 110, a screw 190 fixedly connected to the bevel pinion gear 150, and a nut 200 fixedly mounted in the forehead pad frame 40 and receiving the screw 190. Additionally, the eye relief adjustment mechanism 100 includes a wheel housing assembly 160 on which the adjustment wheel 110 is rotatably mounted. In an embodiment, the wheel housing assembly 160 includes a base 162, a first wheel housing 170 attached to the base, and a second wheel housing 180 connected to the first wheel housing 170.

Still referring to FIGS. 1A and 1B, the adjustment wheel 110 includes an internal bevel gear ring 120, and can further include an annular grip 130 disposed on an outer surface of the internal bevel gear ring 120 and forming a slip-resistant gripping surface for the user's finger(s) or thumb. For example, the annular grip 130 can be made of a polymer such as rubber, but is not limited thereto. In another embodiment, the annular grip 130 can be omitted, and the outer surface of the internal bevel ring gear 120 can be textured to form a slip-resistant gripping surface for the user's finger or thumb.

Figure 2A:
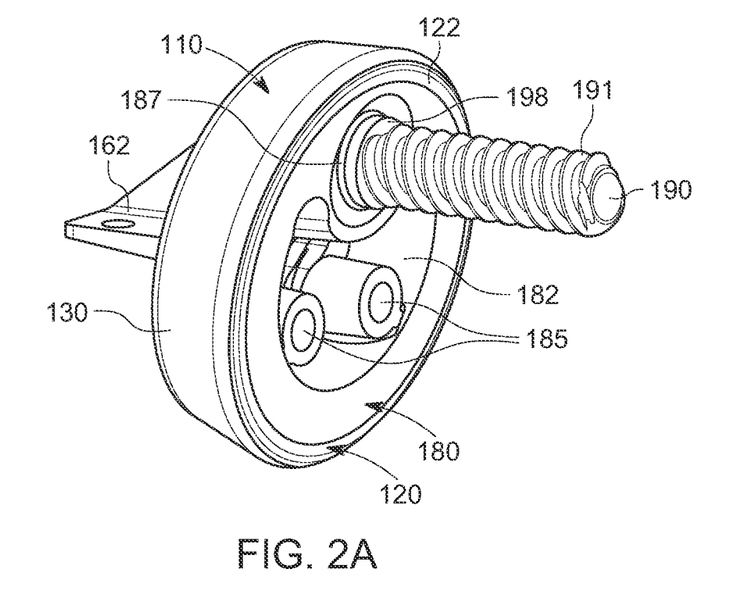
FIG. 2A is a front perspective view showing components of the eye relief adjustment mechanism.
Figure 2B:
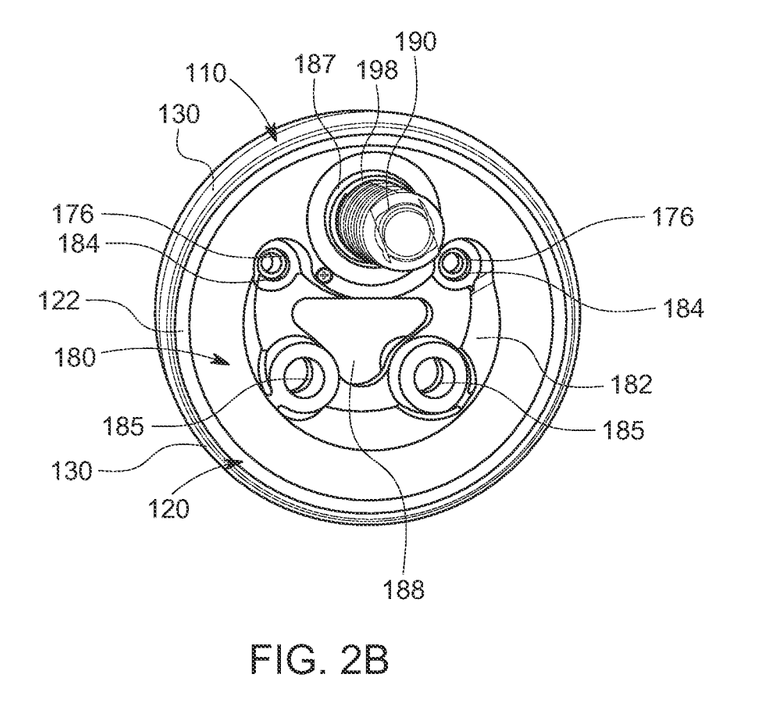
FIG. 2B is a front view showing the components of FIG. 2A.
Figure 2C:
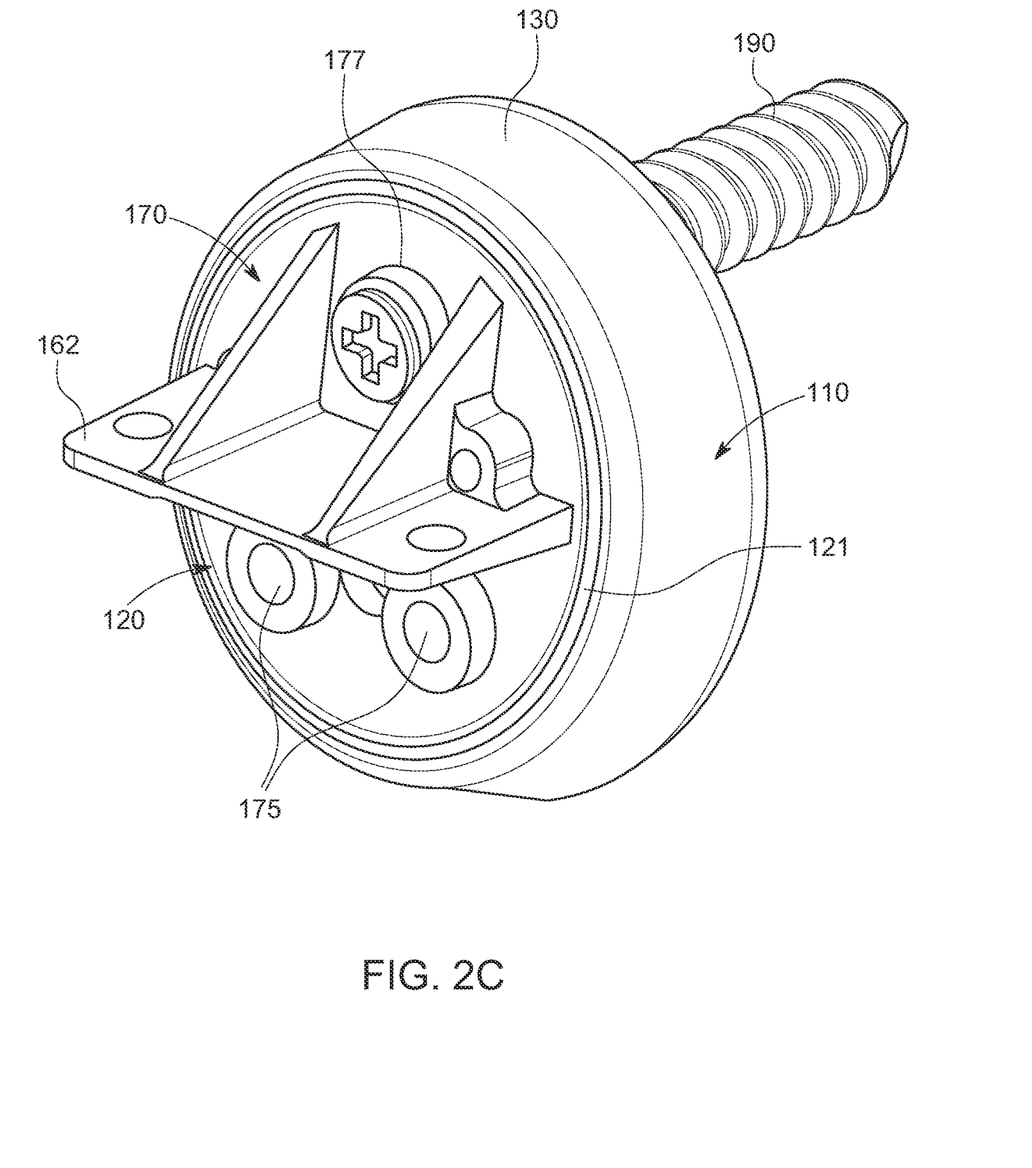
FIG. 2C is rear perspective view showing the components of FIG. 2A.
Figure 3A:
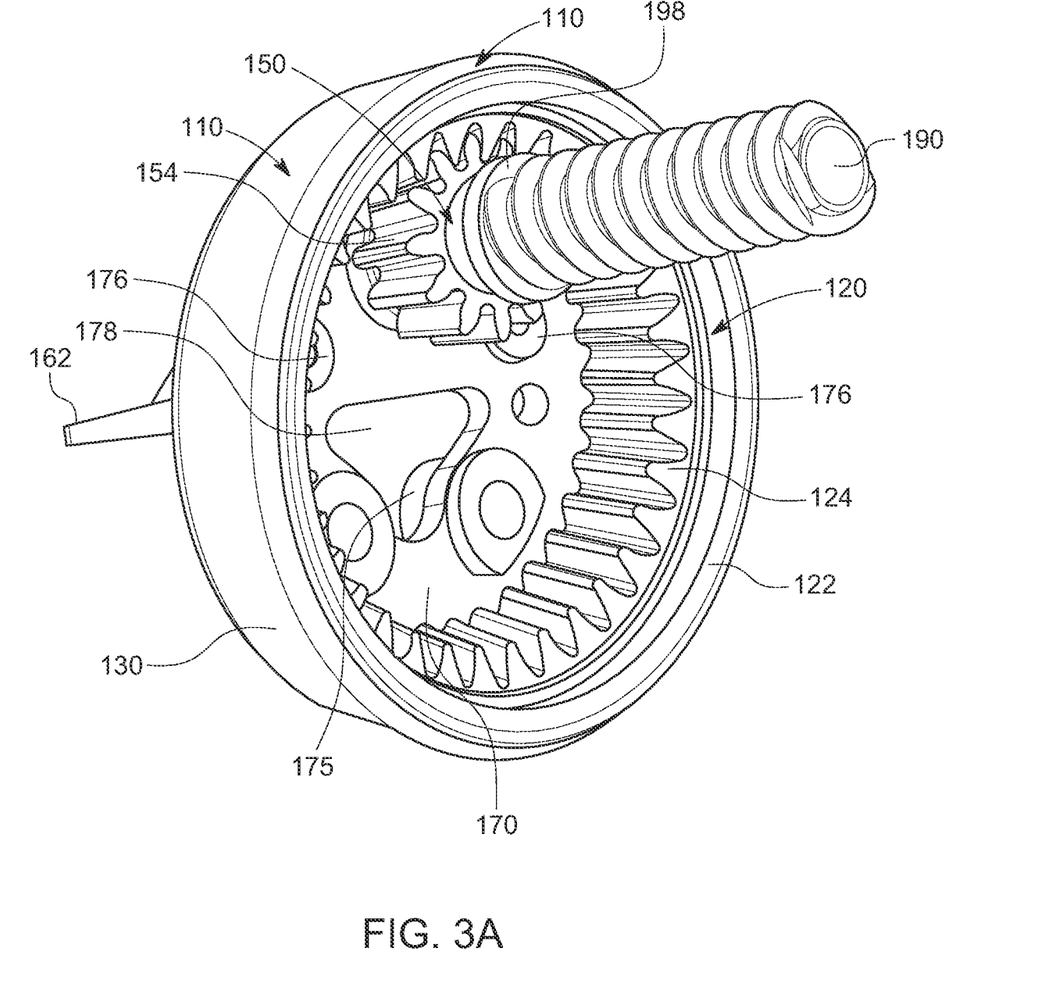
FIG. 3A is perspective view showing some of the components of FIGS. 2A and 2B.
Figure 3B:
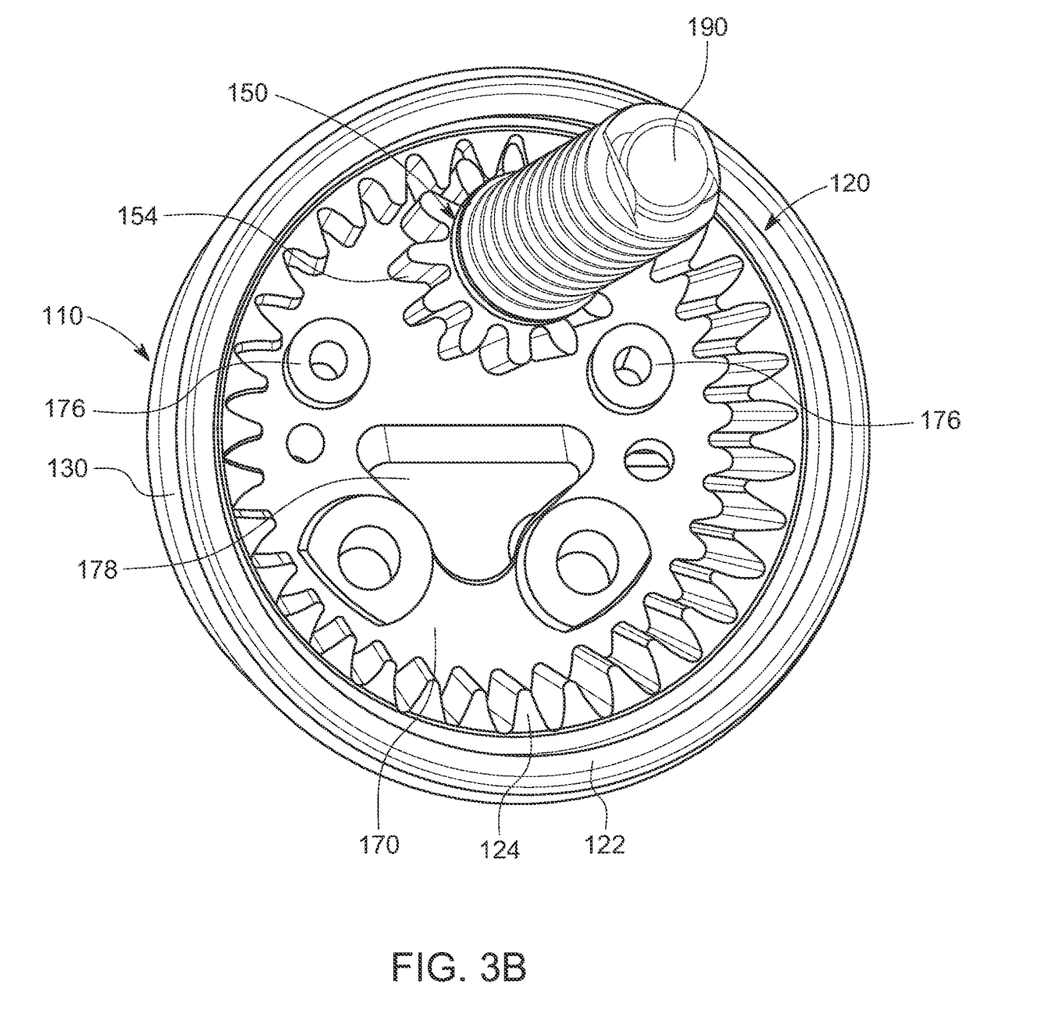
FIG. 3B is a front view showing the components of FIG. 3A.
Figure 3C:
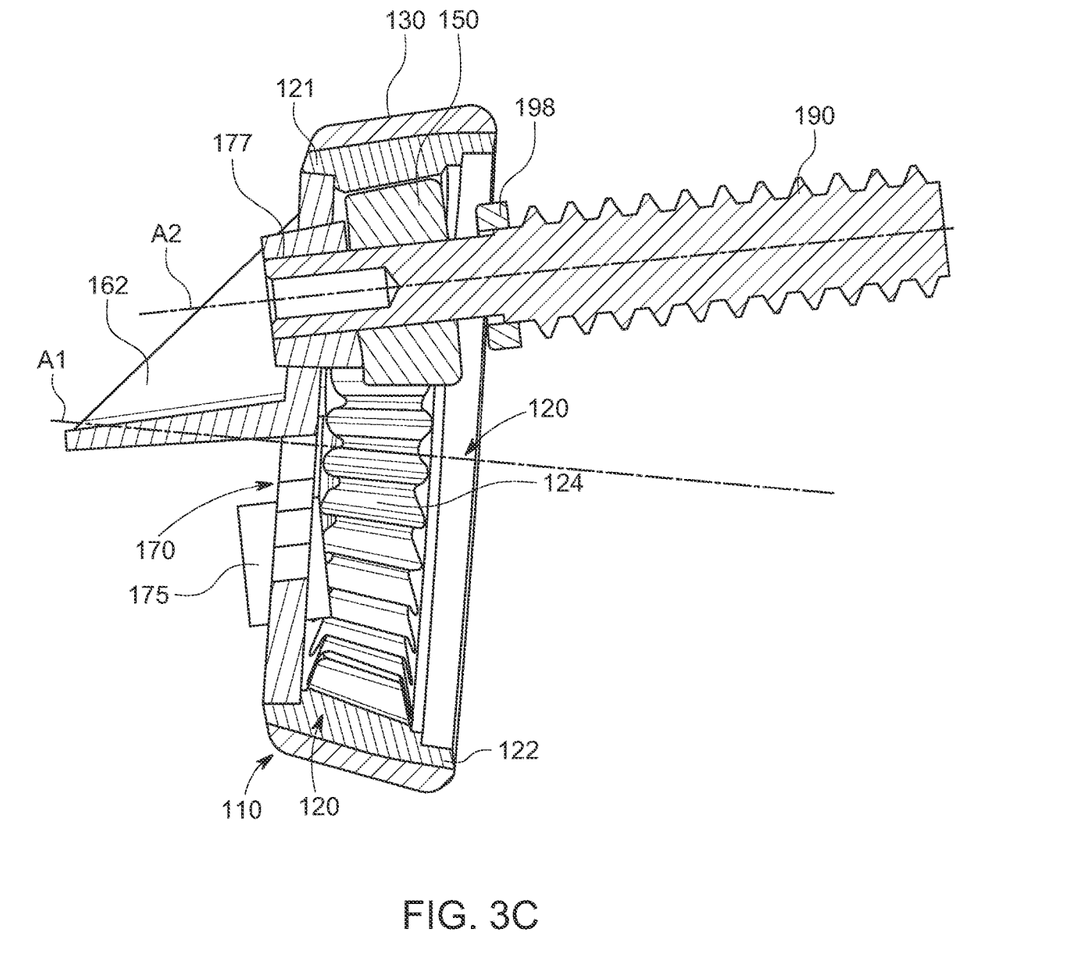
FIG. 3C is a side cross-sectional view showing the components of FIG. 3A.

FIG. 2A is a front perspective view showing components of the eye relief adjustment mechanism 100. FIG. 2B is a front view showing the components of FIG. 2A. FIG. 2C is rear perspective view showing the components of FIG. 2A. FIGS. 3A, 3B, and 3C are perspective, front, and side cross-sectional views, respectively, illustrating components illustrating the components of FIGS. 2A and 2B, except for the second wheel housing 180. The second wheel housing 180 is eliminated in FIGS. 3A to 3C to more completely show the internal bevel gear ring 120, the bevel pinion gear 150 and the screw 190.

Referring to FIGS. 1B, 2A to 2C, and 3A to 3C, the first wheel housing 170 and the second wheel housing 180 are disposed at opposite sides of the adjustment wheel 110, and support the adjustment wheel 110 such that the adjustment wheel 110 (e.g., the internal bevel gear ring 120 and the annular grip 130) can rotate about its rotational axis A1 (a first axis or input axis) when rotated by a user's finger(s) or thumb. More specifically, when rotated by the user's finger (s) or thumb, the adjustment wheel 110 (e.g., the internal bevel gear ring 120 and the annular grip 130) rotates with respect to the first and second wheel housings 170 and 180, which are fixedly mounted.

Referring to FIGS. 1B, 2A, 2C, 3A, and 3C, the base 162 of the wheel housing assembly 160 is attached to a first frame member 50 in the headset display device 10. The first wheel housing 170 is disk-shaped and supports the adjustment wheel 110 thereon. The first wheel housing 170 can be integrally formed with the base 162.

The second wheel housing 180 is disk-shaped and supports the adjustment wheel 110 thereon. As shown in FIGS. 1B, 2B, and 3B, the second wheel housing 180 can have a recessed central portion 182 including holes 184 for attaching the second wheel housing 180 to the first wheel housing 170. For example, the first wheel housing 170 can include protrusions 176 that are respectively received in the holes 184, as shown in FIGS. 2B, 3A, and 3B, thereby securing the second wheel housing 180 to the first wheel housing 170. Additionally, the first wheel housing 170 can include first mounting holes 175 that receive protruding portions of the first frame member 50 to secure the first wheel housing 170 to the first frame member 50. As shown in FIGS. 1B, 2A, and 2B, the second wheel housing 180 can include second mounting holes 185 in the recessed central portion 182 that receive protruding portions of a second frame member 60 in the headset display device 10.

Referring to FIGS. 1B and 3C, the first wheel housing 170 supports a first outer portion 121 of an inner surface of the internal bevel gear ring 120. The first wheel housing 170 has a diameter that is slightly smaller than the inner diameter of the internal bevel gear ring 120 at the first outer portion 121. The second wheel housing 180 supports a second outer portion 122 of the internal surface of the internal bevel gear ring 120 that is opposite the first outer portion 121. The second wheel housing 180 has a diameter that is slightly less than the inner diameter of the internal bevel gear ring 120 at the second outer portion 122. Thus, the first wheel housing 170 and the second wheel housing 180 support the internal bevel gear ring 120 such that the inner surface of the internal bevel gear ring 120 can slide along outer circumferential edges of the first wheel housing 170 and the second wheel housing 180 as the adjustment wheel 110 is rotated. Additionally, the first and second wheel housings 170 and 180 seal an interior space of the adjustment wheel 110 to prevent foreign objects and contaminants such as dirt and debris from entering the interior space of the adjustment wheel 110 and negatively affecting operation of the eye relief adjustment mechanism.

As shown in FIGS. 1B and 3A to 3C, the internal bevel gear ring 120 includes the first outer portion 121, the second outer portion 122, and a plurality of gear teeth 124 disposed between the first and second outer portions 121 and 122. The internal bevel gear ring 120 has a conical pitch surface. The bevel pinion gear 150 is disposed in an interior space bounded by the internal bevel gear ring 120 and is meshed with the internal bevel gear ring 120 to be driven thereby. More specifically, the bevel pinion gear 150 includes a plurality of gear teeth 154 configured to mesh with the plurality of gear teeth 124 and has a conical pitch surface that aligns with the conical pitch surface of the internal bevel gear ring 120.

Referring to FIGS. 1B, 2A to 2C, and 3C, the first and second wheel housings 170 and 180 include openings 177 and 187, respectively, in which the screw 190 is rotatably mounted. Additionally, a spacer or thrust washer 198 can be disposed on the screw 190 to prevent threads 191 of the screw 190 from rubbing against the second wheel housing 180. As shown in FIGS. 1B, 2B, and 3A first and second wheel housings 170 and 180 further include openings 178 and 188, respectively. In some embodiments, a datuming component 70 for a main thermal frame extends through the openings 178 and 188 and the open interior space of the adjustment wheel 110/internal bevel gear ring 120. Thus, the openings 178 and 188 and the open interior space of the adjustment wheel 110/internal bevel gear ring 120 enable efficient configuration of the datuming component 70 by not requiring the datuming component 70 to be routed around the structure of the adjustment wheel 110 and the first and second wheel housings 170 and 180.

Referring to FIG. 1B, the nut 200 includes internal threads 201, and the screw 190 is received in the nut 200 such that the threads 191 of the screw 190 engage the internal threads 201 of the nut 200.

Operation of the eye relief adjustment mechanism 100 will now be described with reference to FIGS. 1B and 3C.

As shown in FIG. 3C, the adjustment wheel 110/internal bevel gear ring 120 can be rotated by a user in the rotational directions R1 and R2 about the rotational axis A1. The bevel pinion gear 150 has a rotational axis A2 (a second axis or output axis). In response to the internal bevel gear ring 120 being rotated in the rotational direction R1 or R2 about the input axis A1, the bevel pinion gear 150 rotates about the output axis A2 in a rotational direction opposite the direction R1 or R2. Because the screw 190 and the bevel pinion gear 150 are fixed together, the screw 190 rotates together with the bevel pinion gear 150. That is, rotation of the adjustment wheel 110 drives rotation of the bevel pinion gear 150 and the screw 190. Referring to FIG. 1B, when the bevel pinion gear 150 and the screw 190 are rotated about the output axis A2 by rotation of the internal bevel gear ring 120 in the rotational direction R1 or R2, the nut 200 moves along threads 191 of the screw 190. More specifically, the nut 200 can translate along the screw 190 in the direction X1 or X2 in response to the rotation of the screw 190 about the output axis A2, thereby moving the forehead pad 30 with the forehead pad frame 40 in the direction X1 or X2 to adjust the eye-to-lens distance of the headset display device 10.

Due to the conical pitch surfaces of the internal bevel gear ring 120 and the bevel pinion gear 150, the output axis A2 is inclined with respect to the input axis A1 (or vice-versa), as shown in FIGS. 1B and 3C. In an example, an angle of incline between the input axis A1 and the output axis A2 can be about 10 degrees. Since the central axis of the screw 190 coincides with the output axis A2 and the central axis of the internal bevel gear ring 120 coincides with the input axis A1, the screw 190 is angled with respect to the central axis of the internal bevel gear ring 120 such that space for other components, such as the datuming component 70 (FIG. 1B), to pass through the interior space of adjustment wheel is increased in comparison to a configuration in which input and output axes are parallel to each other. Additionally, the due to the conical pitch surfaces of the internal bevel gear ring 120 and the bevel pinion gear 150, the orientation of the internal bevel gear ring 120 can be tilted to provide sufficient clearance between the internal bevel gear ring 120 and a main optical rail 80 of the headset display device 10. Thus, the eye relief adjustment mechanism 100 is configured to provide a high degree of packaging efficiency.

In an embodiment, the internal bevel gear ring 120 and the bevel pinion gear 150 can have a gear ratio of about 3:1 and the screw 190 can have a pitch of about 2.7 mm. In an embodiment two full rotations of adjustment wheel 110 in the rotational direction R1 or R2 yields about 12 mm of travel of the nut 200 (and, thus, the forehead pad 30) in the direction X1 or X2. That is, a 360-degree rotation of the adjustment wheel can cause the nut 200 (and, thus, the forehead pad 30) to move about 6 mm in the direction X1 or X2. Accordingly, the eye relief adjustment mechanism 100 can provide a high degree of mechanical advantage when a user rotates the adjustment wheel 110, such that relatively few turns of the adjustment wheel 110 are required to achieve a full range of travel of the forehead pad 30.

According to the embodiments described herein, an adjustment mechanism for adjusting an eye-to-lens distance of a headset display device includes an adjustment wheel having an internal bevel gear ring that can be rotated by a user's finger(s) or thumb to drive transmission components (e.g., a pinion gear, a screw fixed to the pinion gear, and a nut engaging the screw) to efficiently adjust a position of a forehead pad, and thereby change an eye-to-lens distance of the headset display device. An output axis about which the pinion gear and the screw rotate can by inclined with respect to an input axis about which the adjustment wheel rotates. As a result, the configurations and orientations of the internal bevel gear ring, the pinion gear, and the screw provide a relatively large space between the internal bevel gear ring and the screw, to accommodate components of the headset display device.

Additionally, due to the configurations of the internal bevel gear ring, the pinion gear, and the screw, the internal bevel gear ring can be tilted inside the headset display device to provide adequate clearance from a main optical rail of the headset display device.

Furthermore, due to the configurations of the internal bevel gear ring, the pinion gear, and the screw, the adjustment mechanism provides a substantial mechanical advantage to a user when the user rotates the adjustment wheel, such that a small amount of rotation of the adjustment wheel yields a relatively large amount of linear movement of the forehead pad.

Reference in this specification to "embodiments" (e.g., "some embodiments," "various embodiments," "one embodiment," "an embodiment," etc.) means that a particular feature, structure, or characteristic described in connection with the embodiment is included in at least one embodiment of the disclosure. The appearances of these phrases in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "includes" and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Although the subject matter has been described in language specific to structural features and/or methodological acts, it is to be understood that the subject matter defined in the appended claims is not necessarily limited to the specific features or acts described above. Specific embodiments have been described herein for purposes of illustration, but various modifications can be made without deviating from the scope of the embodiments. The specific features and acts described above are disclosed as example forms of implementing the claims that follow. Accordingly, the embodiments are not limited except as by the appended claims.

Any patents, patent applications, and other references noted above are incorporated herein by reference. Aspects can be modified, if necessary, to employ the systems, functions, and concepts of the various references described above to provide yet further embodiments. If statements or subject matter in a document incorporated by reference conflicts with statements or subject matter of this application, then this application shall control.

We claim:

1. An adjustment mechanism for adjusting an eye-to-lens distance of a headset display device, the adjustment mechanism comprising:
   an adjustment wheel rotatable by a user and including an internal bevel gear ring configured to rotate about a first axis;
   a pinion gear meshed with the internal bevel gear ring and configured to rotate about a second axis, in response to the internal bevel gear ring being rotated about the first axis;
   a screw fixed to the pinion gear and configured to rotate together with the pinion gear to move a forehead pad of the headset display device; and
   a threaded member disposed in a forehead pad frame supporting the forehead pad, wherein a threaded member receives the screw and is configured to move along the screw to move the forehead pad frame in response to the screw being rotated.

2. The adjustment mechanism of claim 1, wherein the second axis is inclined with respect to the first axis.

3. The adjustment mechanism of claim 2, wherein an angle of incline between the first axis and the second axis is about 10 degrees.

4. The adjustment mechanism of claim 1, further comprising: a nut fixed to a forehead pad frame supporting the forehead pad,
   wherein the nut receives the screw and is configured to move along the screw to move the forehead pad frame, in response to the screw being rotated.

5. The adjustment mechanism of claim 1, further comprising:
   a first wheel housing disposed at a first side of the adjustment wheel and configured to be attached to a first frame member of the headset display device; and
   a second wheel housing disposed at a second side of the adjustment wheel and configured to be attached to a second frame member of the headset display device,
   wherein the first and second wheel housings support an inner surface of the internal bevel gear ring such that the internal bevel gear ring is rotatable with respect to the first and second wheel housings.

6. The adjustment mechanism of claim 5, wherein the first wheel housing includes a first opening and the second wheel housing includes a second opening, and
   wherein the first and second openings and an interior space of the adjustment wheel are configured as a pass-through for a datuming component of a main thermal frame of the headset display device.

7. The adjustment mechanism of claim 1, wherein the internal bevel gear ring and the pinion gear have a gear ratio of about 3:1 and the screw has a pitch of about 2.7 mm.

8. A headset display device, comprising:
   an outer housing;
   lenses disposed in the outer housing and configured to pass an image from a screen;
   a forehead pad attached to the outer housing and configured to engage a forehead of a user to position eyes of the user with respect to the lenses;
   a forehead pad adjustment assembly including:
      an adjustment wheel partially exposed outside the outer housing and including an internal bevel gear ring that is rotatable about a first axis by the user, and
      a pinion gear meshed with the internal bevel gear ring and configured to rotate about a second axis, in response to the internal bevel gear ring being rotated about the first axis, and
   a screw fixed to the pinion gear and operatively connected to the forehead pad, the screw being configured to rotate together with the pinion gear to move the forehead pad and thereby change a distance between the lenses and the forehead pad.

9. The headset display device of claim 8, wherein the second axis is inclined with respect to the first axis.

10. The headset display device of claim 8, wherein the forehead pad adjustment assembly further includes a threaded member disposed in a forehead pad frame supporting the forehead pad, and
    wherein the threaded member receives the screw and is configured to move along the screw, in response to the screw being rotated, to move the forehead pad frame and thereby change the distance between the lenses and the forehead pad.

11. The headset display device of claim 10, wherein the threaded member is a nut.

12. The headset display device of claim 8, wherein the forehead pad adjustment assembly further includes:
    a first wheel housing disposed at a first side of the adjustment wheel and attached to a first frame member of the headset display device; and
    a second wheel housing disposed at a second side of the adjustment wheel and attached to a second frame member of the headset display device,
    wherein the first and second wheel housings support an inner surface of the internal bevel gear ring such that the internal bevel gear ring is rotatable with respect to the first and second wheel housings.

13. The headset display device of claim 12, wherein the first wheel housing includes a first opening and the second wheel housing includes a second opening, and
    wherein a datuming component passes through the first and second openings and an open interior space of the adjustment wheel.

14. The headset display device of claim 8, wherein the adjustment wheel is partially disposed adjacent to a main optical rail of the headset display device, in an interior space of the outer housing.

15. The headset display device of claim 8, wherein a 360-degree rotation of the adjustment wheel causes the forehead pad to move about 6 mm in a direction of the second axis.

16. The headset display device of claim 8, wherein the adjustment wheel includes an annular grip disposed on an outer surface of the internal bevel gear ring.

17. An adjustment mechanism for adjusting an eye-to-lens distance of a headset display device, the adjustment mechanism comprising:
    a first gear disposed in the headset display device and rotatable about a first axis by a user;
    a second gear meshed with the first gear in the headset display device and configured to rotate about a second axis, in response to the first gear being rotated about the first axis;
    a screw fixed to the second gear in the headset display device and configured to rotate together with the second gear to move a forehead pad of the headset display device, wherein the second axis is inclined with respect to the first axis; and a threaded member disposed in a forehead pad frame supporting the forehead pad, wherein a threaded member receives the screw and is configured to move along the screw to move the forehead pad frame in response to the screw being rotated.

18. The adjustment mechanism of claim 17, wherein an angle of incline between the first axis and the second axis is about 10 degrees.

19. The adjustment mechanism of claim 17, wherein the first gear has an open interior space configured to accommodate a datuming component of a main thermal frame of the headset display device.

\* \* \* \* \*